(12) United States Patent
Akamatsu et al.

(10) Patent No.: US 7,460,333 B2
(45) Date of Patent: Dec. 2, 2008

(54) HARD DISK DRIVE WITH HUMIDITY CONTROL USING MEMBRANE ELECTRODE ASSEMBLY

(75) Inventors: Naotoshi Akamatsu, Fujisawa (JP); Toshiaki Ohtani, Yokohama (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 378 days.

(21) Appl. No.: 11/341,162

(22) Filed: Jan. 27, 2006

(65) Prior Publication Data

US 2006/0171065 A1 Aug. 3, 2006

(30) Foreign Application Priority Data

Feb. 3, 2005 (JP) ............... 2005-027638

(51) Int. Cl.
*G11B 33/14* (2006.01)
(52) U.S. Cl. .................................. 360/97.02
(58) Field of Classification Search ........... 360/97.02
See application file for complete search history.

(56) References Cited

U.S. PATENT DOCUMENTS

| 4,967,295 | A | | 10/1990 | Yamauchi et al. | |
|---|---|---|---|---|---|
| 5,075,807 | A | * | 12/1991 | Inoue et al. | 360/97.02 |
| 5,118,261 | A | * | 6/1992 | Yamauchi et al. | 205/765 |
| 5,537,270 | A | * | 7/1996 | Morehouse et al. | 360/97.02 |
| 5,650,890 | A | * | 7/1997 | Kuroki et al. | 360/97.02 |
| 5,734,521 | A | * | 3/1998 | Fukudome et al. | 360/97.03 |
| 5,907,454 | A | * | 5/1999 | Ahn | 360/97.03 |
| 5,958,200 | A | * | 9/1999 | Kessel | 204/415 |
| 6,000,121 | A | * | 12/1999 | Kuroki et al. | 29/603.03 |
| 6,180,146 | B1 | * | 1/2001 | Del Gallo et al. | 426/321 |
| 6,230,614 | B1 | * | 5/2001 | Del Gallo et al. | 99/467 |
| 6,547,953 | B2 | * | 4/2003 | Suzuki et al. | 205/765 |
| 6,618,222 | B1 | * | 9/2003 | Watkins et al. | 360/97.02 |
| 6,758,876 | B2 | * | 7/2004 | Suzuki et al. | 55/385.6 |
| 6,765,753 | B2 | | 7/2004 | Takami | |
| 7,335,244 | B2 | * | 2/2008 | Kisakibaru et al. | 55/385.6 |

* cited by examiner

*Primary Examiner*—Mark Blouin
(74) *Attorney, Agent, or Firm*—Townsend and Townsend and Crew LLP; Darren Gold

(57) ABSTRACT

In one embodiment, a magnetic disk drive is equipped with a mechanism that dehumidifies moisture through a passage or a moisture penetrating body that restrains the flow of water molecules within the magnetic disk drive by means of a membrane electrode assembly for electrolysis dehumidification.

20 Claims, 9 Drawing Sheets

HARD DISK DRIVE WITH HUMIDITY CONTROL USING MEMBRANE ELECTRODE ASSEMBLY

CROSS-REFERENCES TO RELATED APPLICATIONS

This application claims priority from Japanese Patent Application No. JP2005-027638, filed Feb. 3, 2005, the entire disclosure of which is incorporated herein by reference.

BACKGROUND OF THE INVENTION

The present invention relates to a magnetic disk drive. In particular, the invention relates to an improvement in reliability of a magnetic disk drive, used in hostile environments such as for automotive use.

A magnetic disk drive has in the inside of the enclosure high precision parts such as a magnetic disk and a head for magnetic read/write as well as a spindle motor and voice coil motor that drive the magnetic disk and the head for magnetic read/write. A magnetic head flies over the high-speed rotating magnetic disk at a height of the order of nanometers and reads and writes data. A magnetic disk drive enclosure is designed so as to hinder an inflow of the external air into the enclosure to some extent because microfine dust or a trace amount of chemical substances adversely affects data read/write of the magnetic head.

On the other hand, shielding the enclosure from the external air completely changes the temperature within the magnetic disk drive, or produces pressure difference between the inside and outside of the enclosure due to changes in atmospheric pressure, which causes malfunctions such as distortion of the enclosure. As such, the magnetic disk drive is typically formed with tiny breathing holes to prevent the production of pressure difference by ensuring ventilation between the inside and outside. Providing such holes, however, readily causes the inside of the drive to be affected by the external air.

In this case, the main problem is the variation of humidity. An increase in humidity easily generates moisture condensation or the like inside, which increases possible corrosion of magnetic material of the magnetic head and magnetic disk, resulting in a decrease in product reliability. On the other hand, if the humidity within the drive is too low, static electrical charge is readily built up; as a result, the possibility of electrostatic discharge of GMR devices and the like used as the magnetic head is raised, which may result in damage.

In particular, magnetic disk drives are expected to be used in diverse environments such as for automotive use in the future, and thus the matter noted above is increasingly a serious problem. Because of this, magnetic disk drives are made to be hardly affected by external environments in many cases by placing activated carbon, silica gel or the like in the enclosure. For instance, Japanese Patent Laid-Open No. 2003-263882 (Patent Document 1) describes that a moisture absorbent placed within a magnetic disk drive effectively inhibits the moisture change and prevents malfunction due to moisture condensation, wherein the difference of the moisture absorptions in humidity values of 80% and 95% on a moisture absorption isothermal line of the moisture absorbent is 30% or more during moisture absorbing and is 20% or more during moisture discharging based on the weight of the dried moisture absorbent.

Humidity control methods with a moisture absorbent or the like, however, does not have a mechanism of discharging moisture outside, so the absorbent is saturated with water when exposed to a high humidity environment for a long period of time and loses its moisture absorbing capability, creating the problem of the inside humidity becoming finally equal to the outside humidity.

On the other hand, Japanese Patent Laid-Open No. 2-1004 (Patent Document 2) proposes a method that involves removing moisture by water electrolysis using a membrane electrode assembly. The proposed method can discharge moisture outside and has the possibility of basically solving the above problem. However, it has the problems below and is not commercialized.

(1) When the circuit is not conducted, external moisture is dispersed inside through the membrane electrode assembly, leading to a rapid increase in humidity.

(2) The inside of the magnetic disk drive is polluted by contaminants due to carbon paste used for the membrane electrode assembly.

(3) The oxygen generated during electrolysis increases the oxygen concentration inside the magnetic disk drive.

For the prevention of (1) above, it is proposed that, in FIG. 4 of Patent Document 2 mentioned above, the membrane electrode assembly be placed in the concave portion of a top and bottom two-tier structure formed substantially in the center of the base, that a first electrode of the membrane electrode assembly be disposed so as to directly come into contact with the inside of the container, and that a second electrode of the membrane electrode assembly be communicated with the outside of the container through buffer space and further via a dehumidifying port provided in the base.

BRIEF SUMMARY OF THE INVENTION

Where the second electrode of the membrane electrode assembly is communicated with the outside of the container through buffer space and further via a dehumidifying port provided in the base as proposed in Patent Document 2, if the dehumidifying port is made small so as to be capable of effectively restraining the inflow of moisture during the occurrence of turn "off," moisture is condensed on the moisture discharging face of the membrane electrode assembly. Accordingly, generation of moisture condensation leads to performance deterioration of the membrane electrode assembly, and to the breakdown in the worst case.

A feature of the present invention is to solve part of or all of the above problem, and to control the humidity of the inside of a magnetic disk drive and to provide a highly reliable magnetic disk drive.

The present invention provides a dehumidifying passage, which restrains the inflow of water molecules, between the dehumidifying passage face of the membrane electrode assembly and the inside of the enclosure, and provides the magnetic disk drive that causes the humidity of the inside of the magnetic disk drive to be an optimal value, from about 30% to about 60%, while preventing a rapid inflow of humidity into the membrane electrode assembly during conduction stoppage to the membrane electrode assembly.

Further, the present invention is characterized in that the dehumidifying passage is provided by forming a tubular passage in a plate member. Yet further, the present invention is characterized in that the inflow rate coefficient of the dehumidifying passage is limited to about $40 \times 10^{-6}$ g/torr/sec or less. Still further, the present invention is characterized in that the inflow rate coefficient of the dehumidifying passage is limited to about $10 \times 10^{-6}$ g/torr/sec or less. The inflow rate coefficient may be, for example, about $0.5 \times 10^{-6}$ g/torr/sec or more.

In addition, the present invention provides a moisture permeable member, which restrains the inflow of water molecules, between the dehumidifying passage face of the membrane electrode assembly and the inside of the enclosure, and provides the magnetic disk drive that causes the humidity of the inside of the magnetic disk drive to be an optimal value, from about 30% to about 60%, and further prevents the penetration of dust and hydrocarbon contaminants from the membrane electrode assembly into the inside of the enclosure, while preventing a rapid inflow of humidity into the membrane electrode assembly during conduction stoppage to the membrane electrode assembly.

Further, the present invention is characterized in that the moisture permeable member is made of a polymeric film. Yet further, the present invention is characterized in that the inflow rate coefficient of the moisture permeable member is limited to about $10 \times 10^{-6}$ g/torr/sec or less. The inflow rate coefficient may be, for example, about $0.5 \times 10^{-6}$ g/torr/sec or more. Still further, the present invention is characterized in that the polymeric film is a polyvinyl alcohol film.

Additionally, the present invention is characterized in that the space between a lid portion and a base portion constituting the enclosure is sealed with a moisture non-penetrating material to be capable of preventing an extreme increase in the oxygen concentration within the magnetic disk drive due to the oxygen generated by electrolysis by means of the aforementioned membrane electrode assembly. Moreover, the present invention is characterized in that the moisture non-penetrating material is metal foil, one side of which is coated with a sticky material.

The present invention can provide a magnetic disk drive that restrains a humidity increase within the magnetic disk drive, restricts corrosion of the magnetic material of the head/disk included in the magnetic disk drive, and is highly reliable for a long term.

BRIEF DESCRIPTION OF THE DRAWINGS

FIG. 10 is a diagram indicating the degree of foreign matter adherence where the second embodiment of the present invention was applied.

FIG. 11 is a diagram indicating the degree of foreign matter adherence for comparative example 3 in which the polymeric film of the second embodiment was not used.

DETAILED DESCRIPTION OF THE INVENTION

Figure 1:
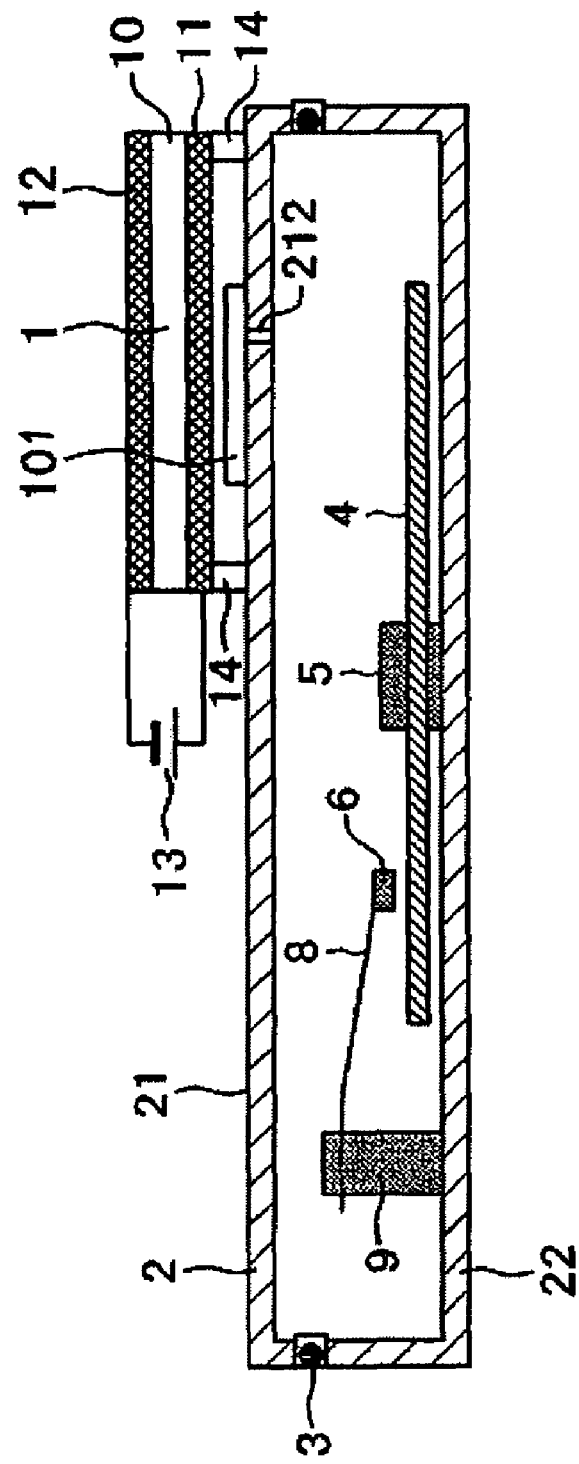
FIG. 1 is a schematic block diagram indicating a first embodiment of a magnetic disk drive, used in diverse environments such as for automotive use, according to the present invention.

Embodiments of a magnetic disk drive according to the present invention will be set forth in reference to the figures.

First Embodiment

A magnetic disk drive of the present invention is used in a variety of environments such as for automotive use in the future. A first embodiment of a magnetic disk drive to be used in diverse environments such as for automotive use in the future as noted above includes, as shown in FIG. 1, an enclosure 2 that has disposed therein a magnetic disk 4 in which data is written (recorded), a magnetic disk driving mechanism 5 that rotates the magnetic disk 4, and a magnetic head mechanism. The magnetic head mechanism includes a magnetic head 6 that performs reading or writing or both of data on the magnetic disk 4, a magnetic head supporting member 8 that supports the magnetic head 6, and a magnetic head driving mechanism 9 for driving to move the magnetic head 6 over the magnetic disk 4 via the magnetic head supporting member 8.

Figure 3:
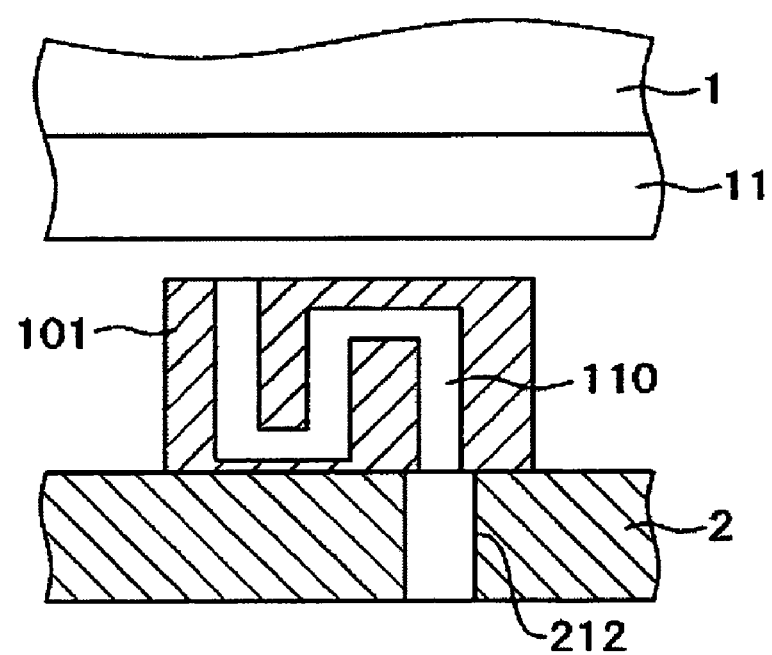
FIG. 3 is a partially enlarged sectional view indicating the first embodiment constructed by connecting the inside of the enclosure to the moisture decomposing side of the membrane electrode assembly by means of the tube dehumidifying passage that restrains the flow of water molecules, according to the present invention.

A membrane electrode assembly (MEA) 1 is disposed outside the enclosure 2; the MEA adjusts the humidity of the inside of the enclosure 2 by removing the moisture of the inside of the enclosure 2 by water electrolysis as shown in FIG. 1. Between the inside of the enclosure and the MEA, a plate member 101 is provided which is formed with a dehumidifying passage 110 that restrains the flow of water molecules, as seen in FIG. 3. A characteristic point of the present invention is to provide the dehumidifying passage 110 for restraining the flow of water molecules between the membrane electrode assembly 1 and the inside of the enclosure.

Figure 2:
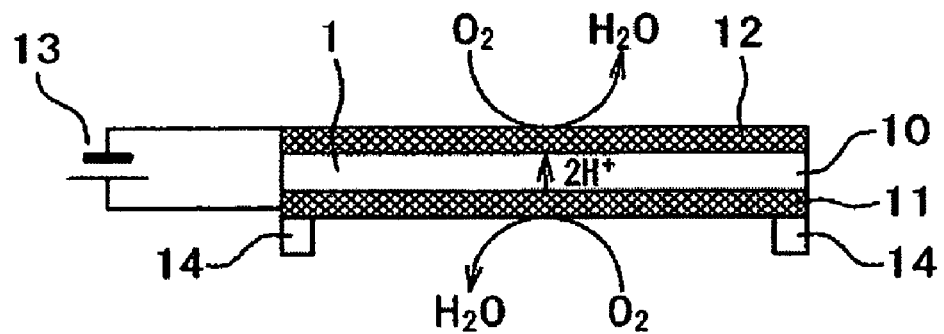
FIG. 2 is a diagram indicating a situation of electrolysis dehumidification in a membrane electrode assembly according to the present invention.

Incidentally, the membrane electrode assembly 1 disposed outside the enclosure 2 includes, as illustrated in FIG. 2, a hydrogen ion conductor 10, a first gas diffusion electrode (anode) 11 and a second gas diffusion electrode (cathode) 12, an insulator 14, and a direct current source 13. The hydrogen ion conductor 10 is made of a solid polymer electrolyte or a solid macromolecule electrolyte such as an ion exchange resin. The first gas diffusion electrode (anode) 11 and the second gas diffusion electrode (cathode) 12 are made of a porous material (e.g., porous carbon paste including platinum catalysis) bonded to the interface of the hydrogen ion conductor 10 by press-contact or vapor deposition so as to sandwich the hydrogen ion conductor 10. The insulator 14 electrically insulates the hydrogen ion conductor 10, the anode 11 and the cathode 12 from the enclosure 2, and separates the surface of the first gas diffusion electrode 11 from the outside of the enclosure 2 (encloses the surface of the first gas diffusion electrode 11). The direct current source 13 is connected between both the electrodes 11 and 12. The first gas diffusion electrode 11 (water decomposing side) is connected to the inside of the enclosure through the dehumidifying passage 110 formed in the plate member 101. The second gas diffusion electrode 12 (water discharging side) remains open, i.e., is directly contacted with the atmosphere, at the outside of the enclosure 2.

When the direct current source 13 installed for the membrane electrode assembly 1 is stopped (e.g., when the magnetic disk drive is turned off), the inflow rate coefficient of this dehumidifying passage 110 is desirably kept low in order to suppress the inflow of water molecules into the enclosure 2 through the dehumidifying passage 110. The flow rate of water molecules through the dehumidifying passage 110 is limited to, for example, about $40 \times 10^{-6}$ g/torr/sec or less, or may be limited to about $10 \times 10^{-6}$ g/torr/sec or less. On the other hand, when the water molecules remaining in the enclosure 2 are discharged from the membrane electrode assembly 1 to the outside of the enclosure 2, the inflow rate coefficient of the dehumidifying passage 110 may be secured to some extent. The flow rate of water molecules through the dehumidifying passage 110 may be, for example, about $0.5 \times 10^{-6}$ g/torr/sec or more.

As described above, in the first embodiment, the space between the inside of the enclosure 2 and the water decomposing side of the membrane electrode assembly 1 (dehumidifying face) (first gas diffusion electrode 11) was connected by means of the dehumidifying passage 110 through the hole 212 formed in the wall of the enclosure 2, for example, as shown in FIG. 3. The dehumidifying passage 110 is formed of one or a plurality of elongated tubes having a diameter of about 1 to about 2 mm, embedded in the plate member 101, and restricts the flow of water molecules. More specifically, the plate member 101 is formed of a plate film that encloses (embeds) the tubular flow passage (dehumidifying passage) 110 that regulates the flow of water molecules. In this way, where the dehumidifying passage 110 is formed of an elongated tube, the elongated tube needs to be made not to be blocked with dust or the like.

In this manner, even if the conduction from the direct current source 13 to the membrane electrode assembly 1 is off on account of some causes, a rapid humidity inflow into the inside of the enclosure can be suppressed since the inflow of water is restricted by the dehumidifying passage 110. In addition, the moisture discharging side of the membrane electrode assembly 1 (moisture discharging face) (second gas diffusion electrode 12) is open, so that a water condensation phenomenon does not occur that is caused by the water molecules discharged from the inside of the magnetic disk drive.

Figure 4:
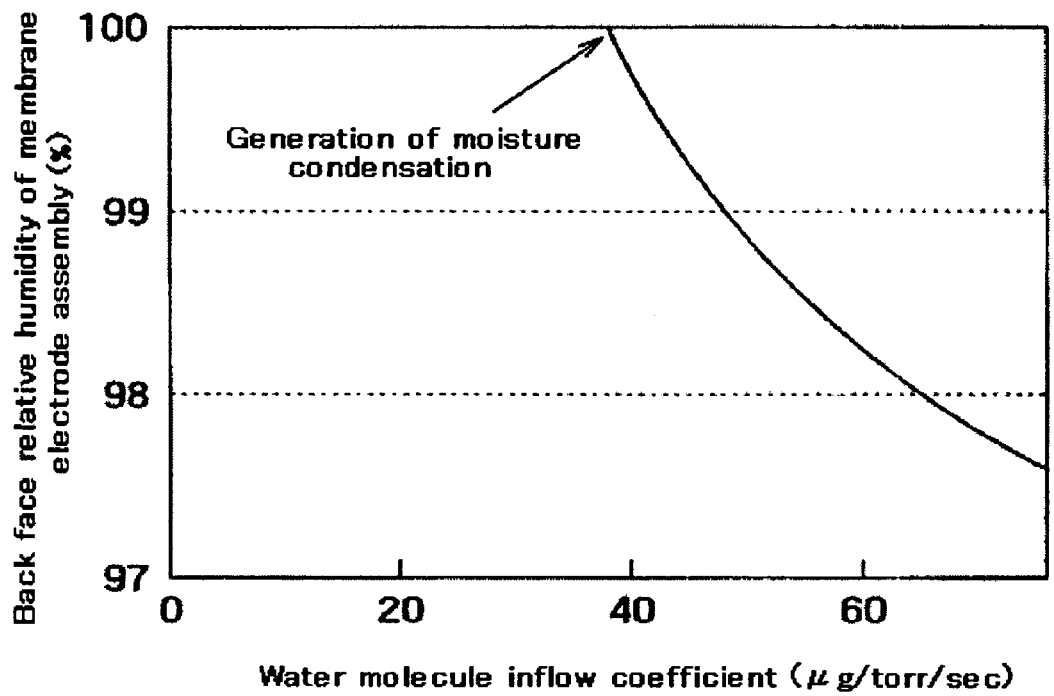
FIG. 4 is a diagram indicating the relationship between the experimental results of the water molecule inflow coefficient (μg/torr/sec) and the back relative humidity (%) of the membrane electrode assembly in comparative example 1 that restrains the flow of the moisture discharging face side of the membrane electrode assembly, on the 2.5 inch type magnetic disk drive.

FIG. 4 shows an experimental result of comparative example 1 in which the flow of the moisture discharging face side is restricted. This experimental result is performed on a 2.5 inch magnetic disk drive generally widely used in magnetic disk drives for automotive use. FIG. 4 indicates that as the inflow coefficient is lowered, the humidity of the back portion of the membrane electrode assembly (moisture discharging face portion) is rapidly increased, with moisture condensation being generated at an inflow coefficient of near $4 \times 10^{-5}$ g/torr/sec. Thus, it is found that the construction of the comparative example that restrains the flow of the moisture discharging face side does not allow the inflow coefficient to be $4 \times 10^{-5}$ g/torr/sec or less.

However, according to the first embodiment of the present invention, the flow of water molecules is restrained by the dehumidifying passage 110 between the inside of the enclosure 2 and moisture decomposing side of the membrane electrode assembly 1 (dehumidifying face) (first gas diffusion electrode 11). Therefore, a rapid humidity inflow can be restrained even when conduction from the direct current source 13 to the membrane electrode assembly 1 is off because of some causes. Also, a moisture condensation phenomenon due to the water molecules discharged from the inside of the magnetic disk drive can be prevented since the moisture discharging side of the membrane electrode assembly 1 (moisture discharging face) (second gas diffusion electrode 12) is open.

Figure 5:
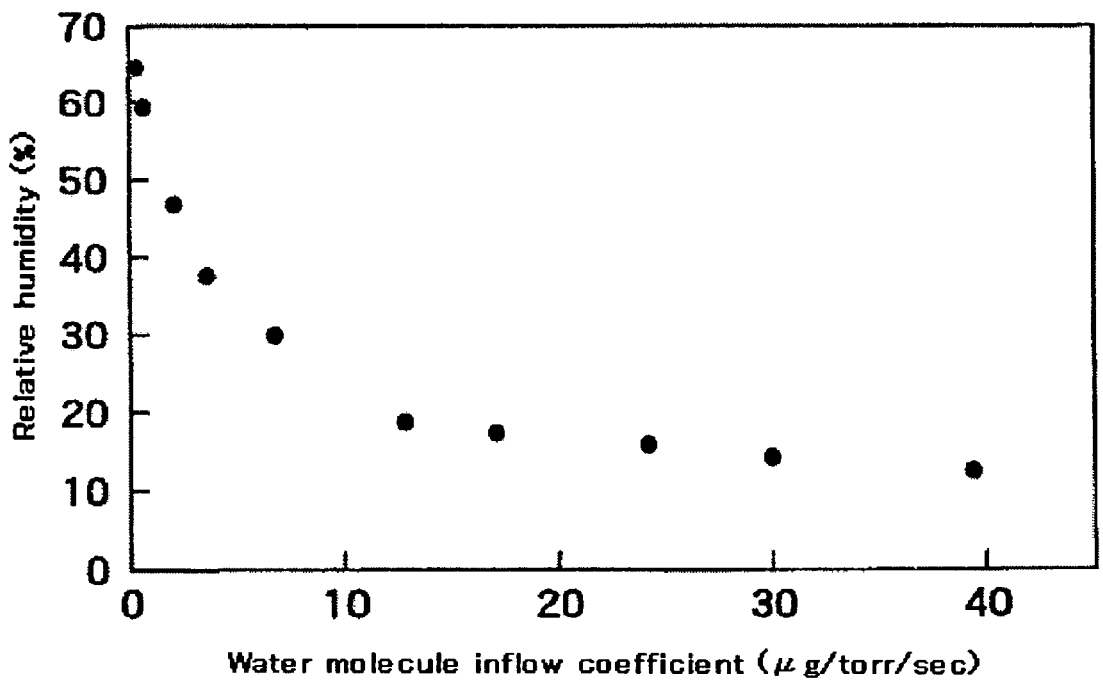
FIG. 5 is a diagram indicating the relationship between the experimental results of the water molecule inflow coefficient (μg/torr/sec) and the stationary state humidity (%) within the magnetic disk drive, in the first embodiment of the present invention.

However, because the dehumidifying passage 110 restrains the flow of water molecules, dehumidifying capability is expected to be lowered. Thus, whether the construction of the first embodiment has a sufficient dehumidifying capability to maintain the reliability of the magnetic disk drive was investigated experimentally. Shown in FIG. 5 are plots of an experimental result of reached humidity levels versus the water molecule inflow coefficient of the dehumidifying passage. The relative humidity of the outside of the magnetic disk drive was set to be 95%. The experimental result indicated in FIG. 5 has shown that decreasing the inflow coefficient by providing the dehumidifying passage 110 increases the reached humidity level caused by dehumidification as well, and that lowering the moisture inflow rate to about $0.5 \times 10^{-6}$ g/torr/sec also can secure a relative humidity within the enclosure of about 65%. As discussed below, the dehumidifying capability proves to be sufficiently applicable to a magnetic disk drive the humidity of which does not need to be extremely lowered.

Figure 6:
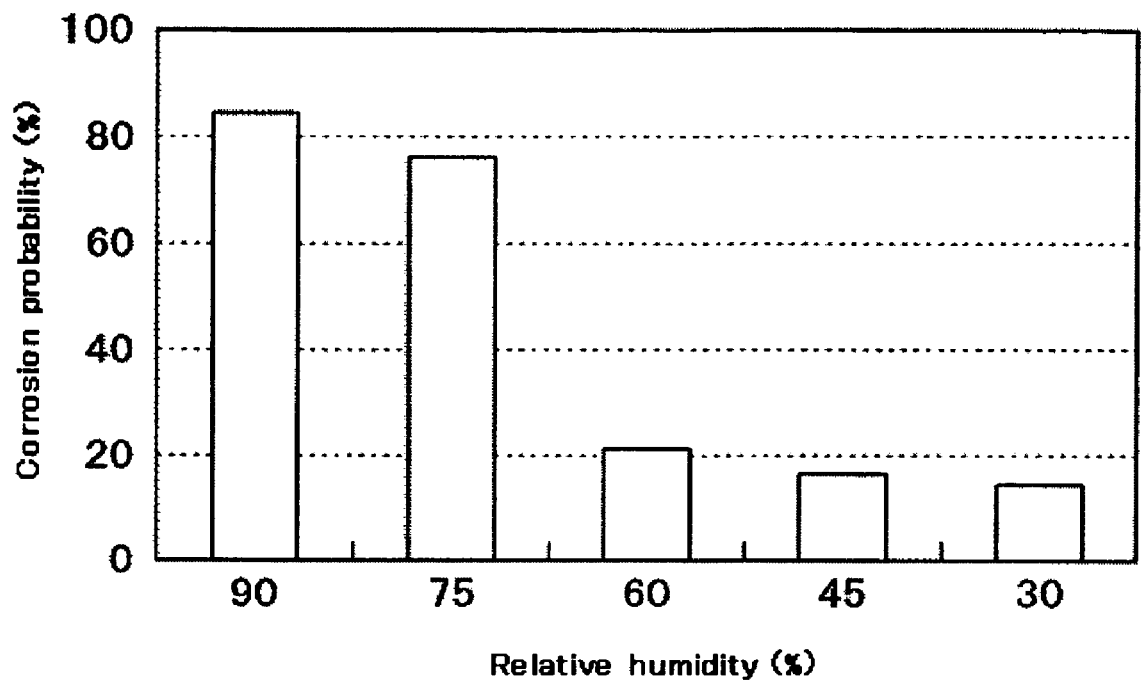
FIG. 6 is a diagram indicating the relationship between the relative humidity (%) and the GMR device corrosion probability (%) according to the present invention.

FIG. 6 shows plots of experimental results of the corrosion probability of a giant magneto resistive (GMR) device generally used in recent magnetic disk drives. Although a carbon protecting film is typically applied to the surface of the GMR device, a GMR device without a carbon protecting film was evaluated in order to directly evaluate the effect of the humidity on GMR device corrosion in this experiment. For the evaluation method, GMR devices were exposed to a constant humidity environment for a constant time and their resistance changes were determined; devices in which the resistances were increased by 1% or more were regarded as corroded. The result of the experiment shown in FIG. 6 has indicated that the corrosion probability is rapidly increased when the relative humidity is from 60% to 75% or more. As such, from the standpoint of corrosion prevention, it has been shown that the humidity of about 60% or less suffices.

On the other hand, for the breakage of the GMR device due to electrostatic discharge (ESD), rendering the humidity too low is not preferable from a charging prevention standpoint. Although quantitative data are presently not available for ESD breakage, making the relative humidity 30% or less is not preferable from the viewpoint of surface charge density and the like even though the GMR device is subjected to charging prevention measures.

In summary, when the flow of water molecules through the dehumidifying passage 110 provided between the inside of the enclosure 2 and the water decomposing side of the membrane electrode assembly 1 (dehumidifying face) is evaluated as the water molecule inflow rate in the above first embodiment, this water molecule inflow rate may be limited to, for example, about $40\times10^{-6}$ g/torr/sec or less, further to about $10\times10^{-6}$ g/torr/sec or less. Moreover, this water molecule inflow rate may be about $0.5\times10^{-6}$ g/torr/sec or more. This condition is merely one embodiment of the present invention; according to this the relative humidity within the magnetic disk drive (enclosure 2) is desirably within the range of from 30% to 65%.

Figure 7:
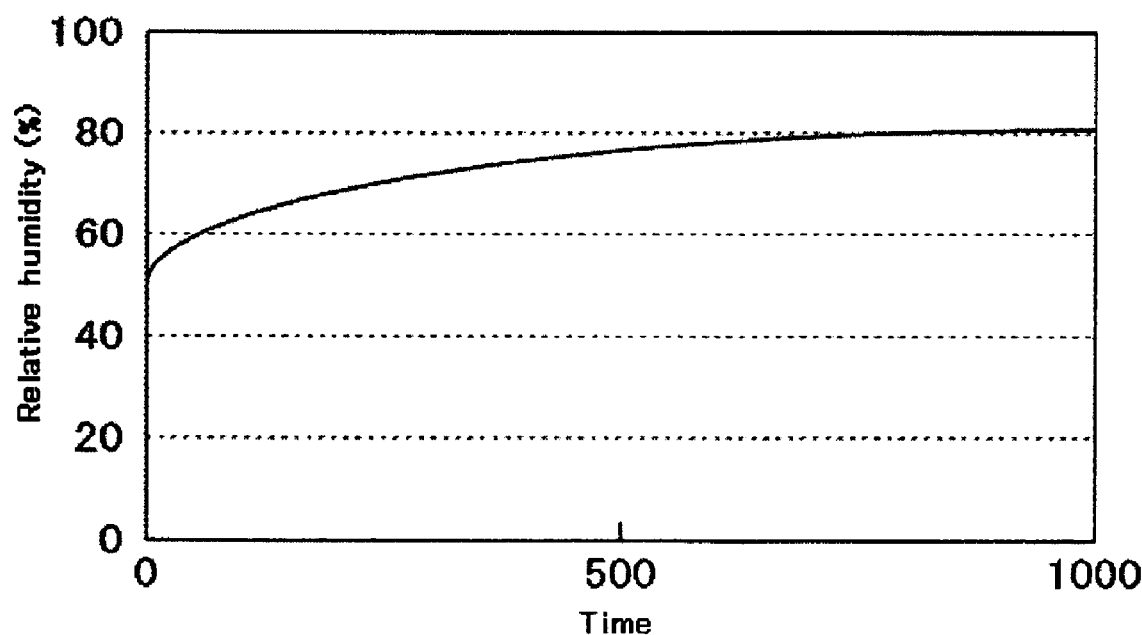
FIG. 7 is a diagram indicating the time elapse of the relative humidity (%), when the power is off, in the first embodiment of the present invention.

Next, in the above first embodiment, the behavior when the direct current source is off will be described in reference to FIG. 7. FIG. 7 shows plots of the humidity change versus time after dehumidification was initiated until the humidity reached 50% at an inside and outside humidity of 95% by means of the membrane electrode assembly 1 that caused the moisture inflow rate on the moisture decomposing side to be limited to about $5\times10^{-6}$ g/torr/sec and the direct current source was off. FIG. 7 illustrates that a rapid increase in humidity is suppressed.

Figure 8:
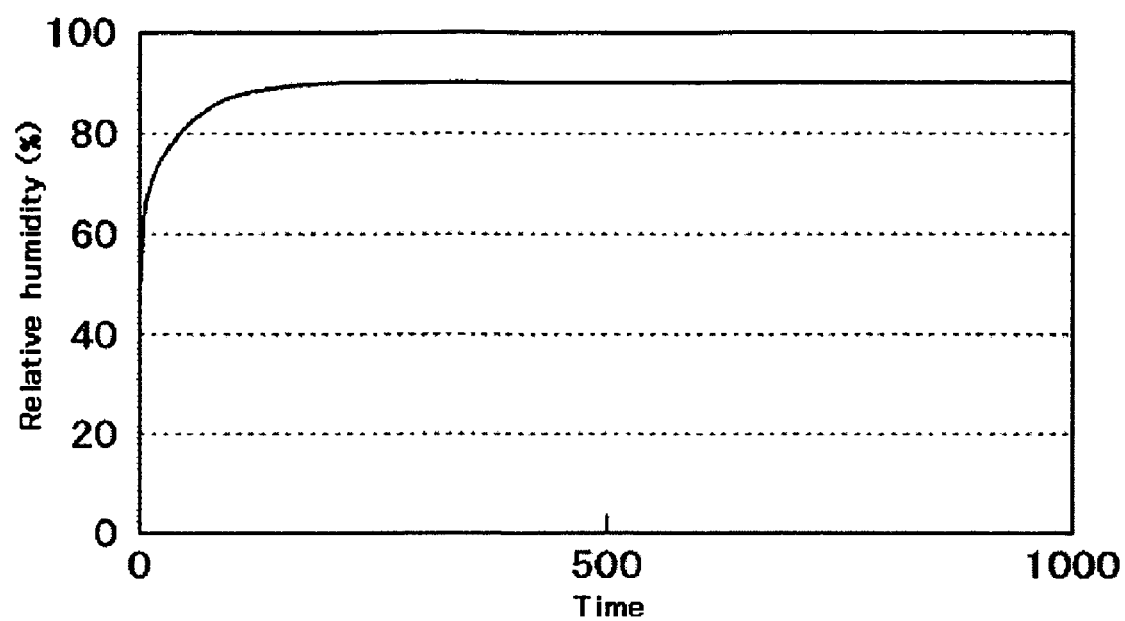
FIG. 8 is a diagram indicating the time elapse of the relative humidity (%), when the power is off, in comparative example 2 in which the membrane electrode assembly without the dehumidifying passage that restrains the flow of water molecules was simply attached to the enclosure.

Shown in FIG. 8 is the result, as comparative example 2, where a membrane electrode assembly is simply placed to the enclosure without a dehumidifying passage that restrains the flow of water molecules.

The first embodiment indicated in FIG. 7 has shown that even when the conduction from the direct current source 13 to the membrane electrode assembly 1 is off due to some causes, the time taken when the humidity is raised to 80% is increased by a factor of 20 as compared with that of comparative example 2 indicated in FIG. 8 and that the dehumidifying passage has the substantial effect of being capable of restraining a rapid humidity inflow into the inside of the enclosure.

Second Embodiment

Figure 9:
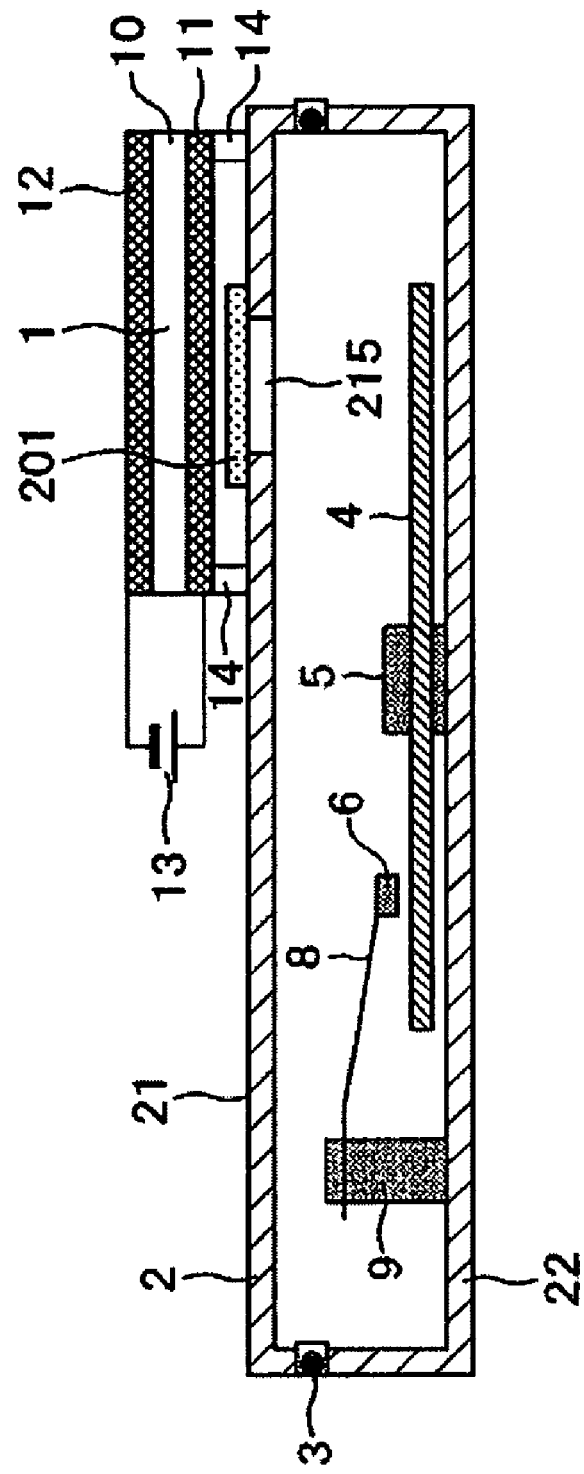
FIG. 9 is a schematic block diagram indicating a second embodiment of a magnetic disk drive, used in diverse environments such as for automotive use, according to the present invention.
Figure 1:
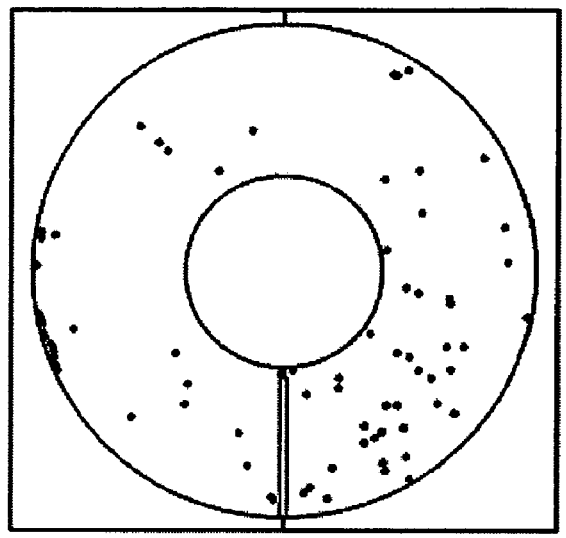
Figure 1:
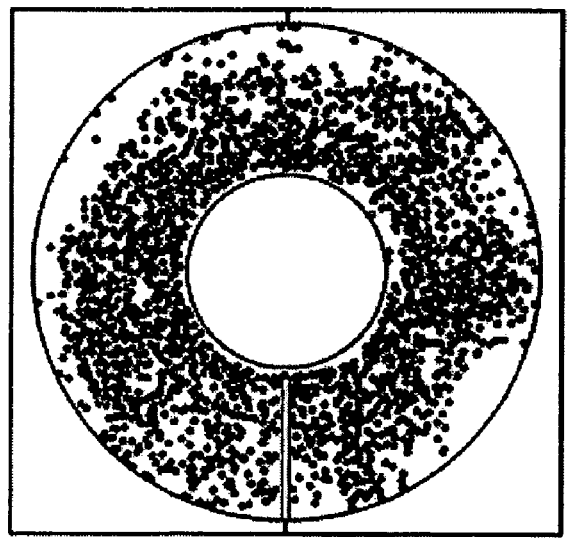

Next, a second embodiment of a magnetic disk drive, of the present invention, used in a variety of environments such as for automotive use in the future will be set forth in reference to FIG. 9. The second embodiment is the same as the first embodiment except that a polymeric film 201 having moisture permeability that restrains the flow of water molecules is provided so as to cover a large opening 215 provided in the wall of the enclosure 2 in place of the plate member 101 having the dehumidifying passage 110 restricting the flow of water molecules embedded (arranged) therein. In other words, the second embodiment provides the polymeric film 201, a moisture permeable member that restricts (restrains) the flow of water molecules, between the inside of the enclosure 2 and the moisture decomposing side (dehumidifying face) of the membrane electrode assembly 1. For example, a film of polyvinyl alcohol having a thickness of about 1 mm was used for the polymeric film 201. The water molecule inflow coefficient through this film was about $2\times10^{-6}$ g/torr/sec. This allows the second embodiment to obtain an effect similar to that of the first embodiment. Furthermore, the polymeric film 201 has the effect of preventing the penetration of dust, into the enclosure 2, from the carbon paste of the gas diffusion electrode used in the membrane electrode assembly 1.

FIGS. 10 and 11 show magnetic disk surfaces that were observed using an optical particle inspecting apparatus after the magnetic disk drives were operated for 40 hours. FIG. 10 indicates the magnetic disk surface when the polymeric film 201 of the second embodiment was used, while FIG. 11 shows the case of comparative example 3 when the polymeric film 201 was not used. It was ascertained that an amount of particles adhered on a disk in the second embodiment can be greatly decreased, at about 1/80, as compared to that of comparative example 3 in which the polymeric film 201 was not used.

Further, the second embodiment can simply provide a desired inflow coefficient rate by changing the thickness of the macromolecule 201 and is excellent in both cost efficiency and mass productivity. Furthermore, according to the second embodiment, a large area is provided by using the polymeric film 201, leading to the possibility of causing little clogging.

Third Embodiment

Figure 12:
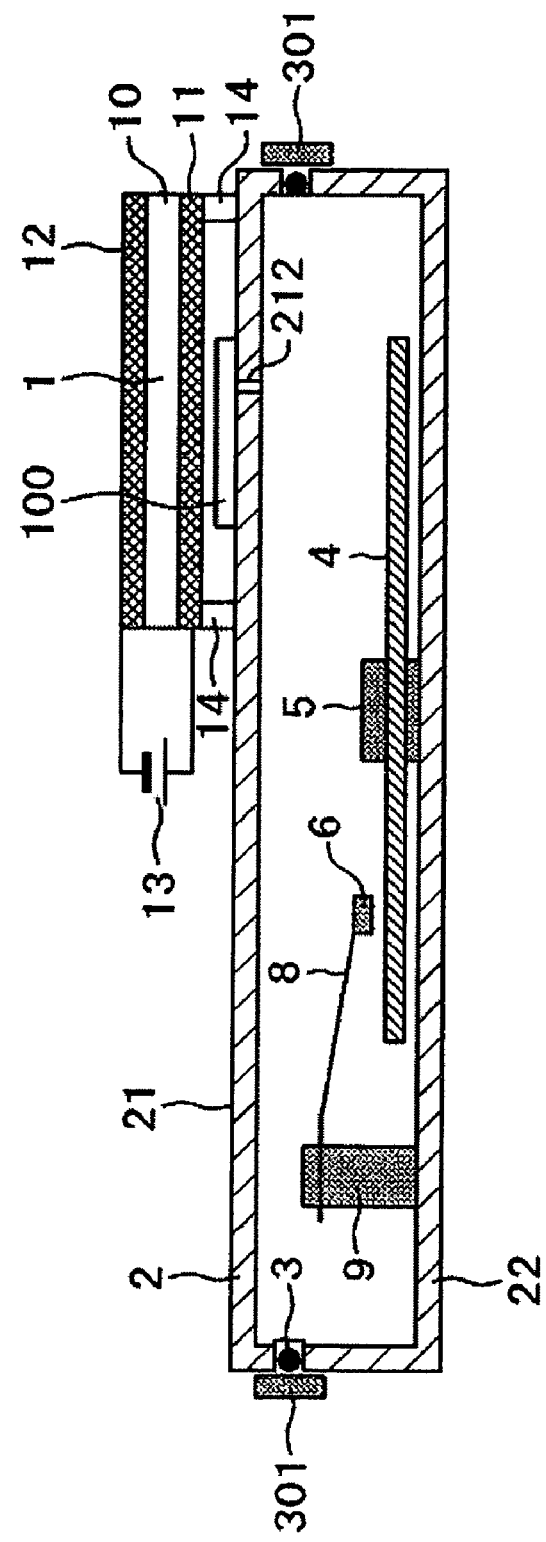
FIG. 12 is a schematic block diagram indicating a third embodiment of a magnetic disk drive, used in diverse environments such as for automotive use, according to the present invention.

Next, a third embodiment of a magnetic disk drive, of the present invention, used in a variety of environments such as for automotive use in the future will be set forth in reference to FIG. 12. The enclosure 2, as described in the first embodiment, is assembled by housing therein the magnetic disk 1 that writes data, the driving mechanism 5 that rotates the magnetic disk 1 and the magnetic head mechanism. A lid portion 21 is attached to a base portion 22 so that the enclosure is sealed. In addition, on the base portion 22 are mounted primary parts of the magnetic disk drive. Incidentally, for electrolysis dehumidification by the membrane electrode assembly 1 as shown in FIG. 2, oxygen is generated inside the enclosure; thereby increase in the oxygen concentration is expected. The oxygen generated in excess promotes the magnetic head/disk corrosion reaction, causes the deterioration of a lubricant coated on the magnetic disk surface, and the like, raising the possibility of seriously affecting the long-term reliability. Hence, in the third embodiment, the lid portion 21 and the base portion 22 of the enclosure 2 were sealed with aluminum foil tape 301 in addition to the construction of the first or second embodiment as excess oxygen generation measures, as illustrated in FIG. 12.

Figure 13:
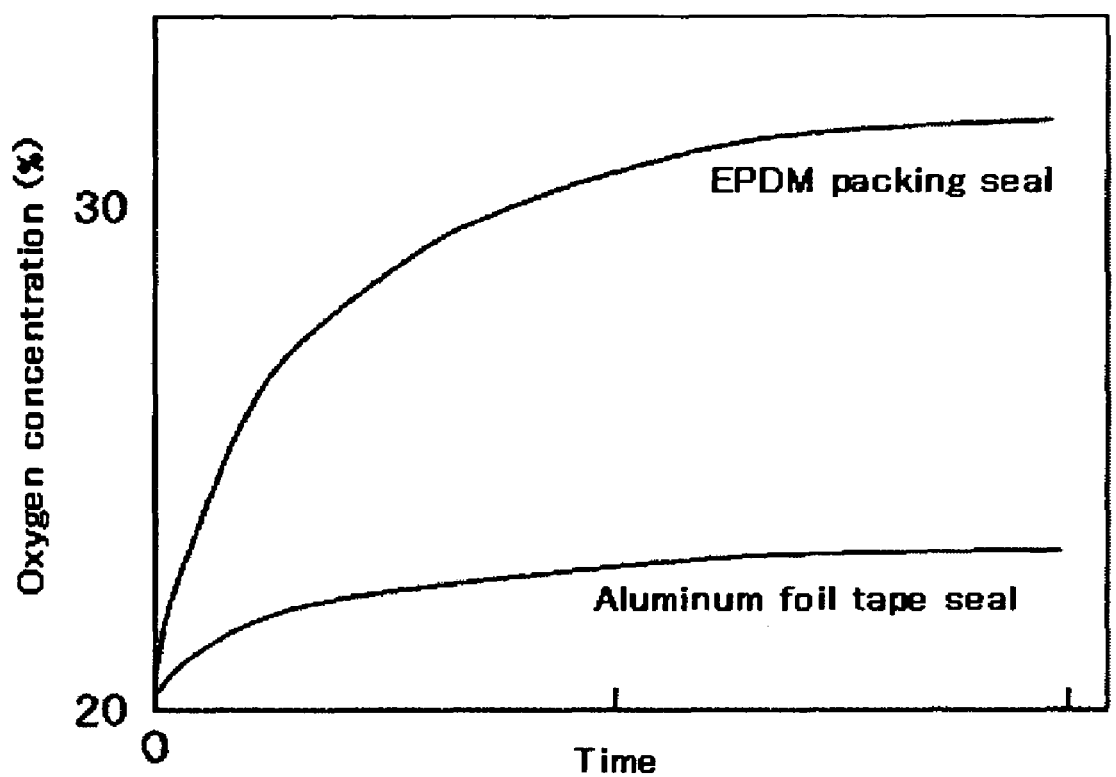
FIG. 13 is a diagram indicating the oxygen concentration time elapse for the aluminum foil tape seal of the third embodiment of the present invention and the EPDM packing seal of comparative example 4.

FIG. 13 shows the experimental results of oxygen concentrations measured in stationary states after a constant time elapse for the case where the aluminum foil tape 301 was employed for sealing as in the third embodiment and the case where resin packing such as EPDM packing or the like of comparative example 4, which is usually used in recent magnetic disk drives, is used for sealing, for comparison. It was found that for the case where a normal EPDM (ethylene-propylene-diene methylene linkage: ethylene/propylene/diene three-component copolymer) packing in comparative example 4 was used for sealing, the oxygen concentration was 30% or more, but that for the case where the aluminum foil tape 301 of the third embodiment was used for sealing, the oxygen concentration remained about 23%, whereby the latter has the effect of suppressing the oxygen concentration increase.

This seems to be because the moisture penetrating rate in resin packing such as made of EPDM of comparative example 4 is considerably large as compared with the oxygen penetrating rate. As such, the moisture that is penetrated from the resin packing portion is decomposed by the membrane electrode assembly, generating oxygen. If the moisture inflow from the resin packing portion is the main passage of moisture inflow in this way, the generation rate of oxygen is close to the value of the moisture penetrating coefficient of resin packing. On the other hand, because resin packing has a low oxygen penetrating coefficient, an amount of oxygen equivalent to that of generated oxygen cannot be discharged outside, resulting in a large increase in oxygen concentration, as shown by the EPDM packing seal of FIG. 13.

Sealing with the aluminum foil tape 301, as in the third embodiment according to the present invention, suppresses the moisture penetration and oxygen penetration from the sealed portion, whereby the main passages of moisture inflow and oxygen outflow are the breathing holes of the magnetic disk drive. In this case, since there is no large difference between the inflow and outflow rates of oxygen and moisture, the oxygen concentration would seem not to be extremely increased, as indicated in terms of the aluminum foil tape seal in FIG. 13.

As discussed above, the embodiments of the first to the third of the present invention can suppress increases in humidity within the magnetic disk drives, and restrain the corrosion of the magnetic materials of the heads/disks within the magnetic disk drives, thereby being capable of obtaining magnetic disk drives that have high long-term reliabilities.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive, comprising:
    a magnetic disk in which information is written;
    a magnetic disk driving mechanism that rotates the magnetic disk; and
    a magnetic head mechanism including a magnetic head that reads and/or writes information on the magnetic disk, and a magnetic head driving mechanism that drives to move the magnetic head relative to the magnetic disk;
    the magnetic disk, the magnetic disk driving mechanism, and the magnetic head mechanism being housed inside an enclosure that restrains the flow of air from the outside,
    wherein the magnetic disk drive includes a membrane electrode assembly formed completely outside the enclosure and configured to adjust the humidity inside the enclosure, and a dehumidifying passage that restrains an inflow of water molecules between a dehumidifying face of the membrane electrode assembly and the inside of the enclosure.

2. A magnetic disk drive of claim 1, wherein the dehumidifying passage is provided by forming a tubular passage in a plate member.

3. A magnetic disk drive of claim 2, wherein an inflow rate coefficient of the dehumidifying passage is limited to about 40×10−6 g/torr/sec or less.

4. A magnetic disk drive of claim 3, wherein the inflow rate coefficient of the dehumidifying passage is limited to about 10×10−6 g/torr/sec or less.

5. A magnetic disk drive of claim 3, wherein the inflow rate coefficient of the dehumidifying passage is limited to about 0.5×10−6 g/torr/sec or more.

6. A magnetic disk drive of claim 2, wherein the enclosure includes a lid portion and a base portion, and the space between the lid portion and the base portion of the enclosure is sealed with a moisture non-permeable material.

7. A magnetic disk drive of claim 6, wherein the moisture non-permeable material is a material produced by coating one side of a metal foil with an adhesive material.

8. A magnetic disk drive of claim 1, wherein an inflow rate coefficient of the dehumidifying passage is limited to about 40×10−6 g/torr/sec or less.

9. A magnetic disk drive of claim 8, wherein the inflow rate coefficient of the dehumidifying passage is limited to about 10×10−6 g/torr/sec or less.

10. A magnetic disk drive of claim 8, wherein the inflow rate coefficient of the dehumidifying passage is limited to about 0.5×10−6 g/torr/sec or more.

11. A magnetic disk drive of claim 1, wherein the enclosure includes a lid portion and a base portion, and the space between the lid portion and the base portion of the enclosure is sealed with a moisture non-permeable material.

12. A magnetic disk drive of claim 11, wherein the moisture non-permeable material is a material produced by coating one side of a metal foil with an adhesive material.

13. A magnetic disk drive, comprising:
    a magnetic disk in which information is written;
    a magnetic disk driving mechanism that rotates the magnetic disk; and
    a magnetic head mechanism including a magnetic head that reads and/or writes information on the magnetic disk, and a magnetic head driving mechanism that drives to move the magnetic head relative to the magnetic disk;
    the magnetic disk, the magnetic disk driving mechanism, and the magnetic head mechanism being housed inside an enclosure that restrains the flow of air from the outside,
    wherein the magnetic disk drive includes a membrane electrode assembly formed completely outside the enclosure and configured to adjust the humidity inside the enclosure, and a moisture permeable member that restrains an inflow of water molecules between a dehumidifying face of the membrane electrode assembly and the inside of the enclosure.

14. A magnetic disk drive of claim 13, wherein the moisture permeable member comprises a polymeric film.

15. A magnetic disk drive of claim 14, wherein the polymeric film is a film of polyvinyl alcohol.

16. A magnetic disk drive of claim 14, wherein the enclosure includes a lid portion and a base portion, and the space between the lid portion and the base portion of the enclosure is sealed with a moisture non-permeable material.

17. A magnetic disk drive of claim 13, wherein an inflow rate coefficient of the moisture permeable member is limited to about 10×10−6 g/torr/sec or less.

18. A magnetic disk drive of claim 17, wherein the inflow rate coefficient of the moisture permeable member is limited to about 0.5×10−6 g/torr/sec or more.

19. A magnetic disk drive of claim 13, wherein the enclosure includes a lid portion and a base portion, and the space between the lid portion and the base portion of the enclosure is sealed with a moisture non-permeable material.

20. A magnetic disk drive of claim 19, wherein the moisture non-permeable material is a material produced by coating one side of a metal foil with an adhesive material.

* * * * *